(12) United States Patent
Saur et al.

(10) Patent No.: US 10,478,930 B2
(45) Date of Patent: Nov. 19, 2019

(54) TOOL ATTACHMENT AND TOOL SYSTEM

(71) Applicant: Robert Bosch GmbH, Stuttgart (DE)

(72) Inventors: Dietmar Saur, Moessingen (DE); Marco Braun, Stuttgart-Feuerbach (DE); Andreas Necker, Waldenbuch (DE)

(73) Assignee: Robert Bosch GmbH, Stuttgart (DE)

( * ) Notice: Subject to any disclaimer, the term of this patent is extended or adjusted under 35 U.S.C. 154(b) by 740 days.

(21) Appl. No.: 14/704,008

(22) Filed: May 5, 2015

(65) Prior Publication Data

US 2015/0321305 A1    Nov. 12, 2015

(30) Foreign Application Priority Data

May 7, 2014    (DE) .................. 10 2014 208 495
Dec. 2, 2014    (DE) .................. 10 2014 224 591

(51) Int. Cl.
| | | |
|---|---|---|
| *B25F 5/00* | (2006.01) | |
| *B25F 3/00* | (2006.01) | |
| *B25B 21/00* | (2006.01) | |
| *B23Q 5/04* | (2006.01) | |

(52) U.S. Cl.
CPC .............. *B23Q 5/045* (2013.01); *B25B 21/00* (2013.01); *B25F 3/00* (2013.01); *B25F 5/00* (2013.01)

(58) Field of Classification Search
CPC . B25F 3/00; B25F 5/00; B23B 31/026; B23B 21/00
USPC .......................................................... 173/29
See application file for complete search history.

(56) References Cited

U.S. PATENT DOCUMENTS

| | | | | |
|---|---|---|---|---|
| 4,493,646 A | | 1/1985 | Lacour et al. | |
| 5,207,528 A | * | 5/1993 | Ludwig ................. | B25B 21/00 403/318 |
| 5,240,360 A | * | 8/1993 | Esser ..................... | B23Q 3/12 408/238 |
| 7,823,483 B2 | * | 11/2010 | Yamada ................. | B23B 49/008 81/429 |

FOREIGN PATENT DOCUMENTS

| | | |
|---|---|---|
| DE | 3227 417 A1 | 2/1983 |
| EP | 511 485 A1 | 11/1992 |
| EP | 2 301 696 A1 | 3/2011 |
| EP | 2 745 990 A2 | 6/2014 |
| FR | 2 704 793 | 11/1994 |
| WO | 92/20491 A1 | 11/1992 |

* cited by examiner

*Primary Examiner* — Chelsea E Stinson
(74) *Attorney, Agent, or Firm* — Norton Rose Fulbright US LLP; Gerard Messina

(57) ABSTRACT

A tool attachment includes: an attachment housing; a fastening interface situated on the attachment housing for detachable fastening on a handheld power tool, the fastening interface having a locking unit which, (i) in a locked state, locks the tool attachment for operation on the handheld power tool, and, (ii) in the unlocked state, enables removal of the tool attachment from the handheld power tool; and a first angle position setting unit for setting a predefined angle position of the tool attachment on the handheld power tool, the first angle position setting unit being operable in the locked state and in the unlocked state of the locking unit to enable a change of the predefined angle position.

23 Claims, 6 Drawing Sheets

TOOL ATTACHMENT AND TOOL SYSTEM

BACKGROUND OF THE INVENTION

1. Field of the Invention

The present invention relates to a tool attachment including an attachment housing, on which a fastening interface is situated for the detachable fastening on a handheld power tool, the tool attachment including at least one first angle position setting unit for setting a predefined angle position of the tool attachment on the handheld power tool and being provided with a locking unit, which, in a locked state, locks the tool attachment for operation on the handheld power tool in the predefined angle position and, in the unlocked state, enables removal of the tool attachment from the handheld power tool.

2. Description of the Related Art

A tool attachment is known from published French patent application document FR 2 704 793 A1, which has a fastening interface, which is provided with an angle position setting unit and a locking unit, for fastening on a handheld power tool. The angle position setting unit is used for setting a predefined angle position of the tool attachment on the handheld power tool. The locking unit has the task, in an associated unlocked state, of enabling installation or removal of the tool attachment on or from the handheld power tool and, in an associated locked state, of locking the tool attachment for operation on the handheld power tool in the predefined angle position. In an intermediate state of the locking unit, neither removal of the tool attachment nor operation of the handheld power tool is provided, but it is possible to adapt the angle position to a changed working situation by operating the angle position setting unit.

The related art has the disadvantage that the handling of such a tool attachment is cumbersome and complicated and therefore may result in convenience losses for a user of the tool attachment.

BRIEF SUMMARY OF THE INVENTION

One object of the present invention is therefore to provide a novel tool attachment, which is fastenable in a predefined angle position on a handheld power tool and in which a change of the predefined angle position may be carried out in an uncomplicated, rapid way which is convenient for a user.

This object is achieved by a tool attachment including an attachment housing, on which a fastening interface is situated for the detachable and replaceable fastening on a handheld power tool, the fastening interface being provided at least with a locking unit, which, in a locked state, locks the tool attachment for operation on the handheld power tool and, in the unlocked state, enables removal of the tool attachment from the handheld power tool, and including a first angle position setting unit for setting a predefined angle position of the tool attachment on the handheld power tool. The first angle position setting unit is operable in the locked state and in the unlocked state of the locking unit to enable a change of the predefined angle position.

This object is also achieved by a tool attachment including an attachment housing, on which a fastening interface is situated for the detachable and replaceable fastening on a handheld power tool, the fastening interface being provided at least with a locking unit, which, in a locked state, locks the tool attachment for operation on the handheld power tool and, in the unlocked state, enables removal of the tool attachment from the handheld power tool, and in which a drive unit for the drive of a tool receptacle of the tool attachment is situated, and including a first angle position setting unit for setting a predefined angle position of the tool attachment on the handheld power tool. The first angle position setting unit is operable to enable a change of the predefined angle position of the drive unit in relation to the fastening interface.

The first angle position setting unit is designed in particular to enable setting of the predefined angle position when the fastening interface is fastened on the handheld power tool.

The fastening interface for the detachable and replaceable fastening of the tool attachment according to the present invention on the handheld power tool is designed to enable axial securing and an anti-twist protection of the tool attachment on the handheld power tool. In one specific embodiment, the fastening interface is designed in such a way that it causes axial securing and an anti-twist protection of the tool attachment on a stationary housing component, for example, a component of the transmission housing. In an alternative specific embodiment, the fastening interface is designed in such a way that it causes axial securing of the tool attachment on an output shaft of the handheld power tool, while it causes an anti-twist protection on a stationary housing component, for example, a component of the transmission housing. The fastening interface includes at least one securing element for the axial securing of the tool attachment on the handheld power tool and at least one securing element for the anti-twist protection of the tool attachment on the handheld power tool. The at least one securing element for the axial securing is preferably designed to cause axial securing of the tool attachment on a stationary housing component. Alternatively, the at least one securing element for the axial securing may be designed to cause axial securing of the tool attachment on an output shaft of the handheld power tool. The at least one securing element for the axial securing is designed in particular as a locking unit for locking the tool attachment on the handheld power tool. The at least one securing element for the anti-twist protection of the tool attachment may be designed as an angle position setting unit for setting a predefined angle position of the tool attachment on the handheld power tool.

The first angle position setting unit of the tool attachment according to the present invention has the advantage that it is designed independently of the fastening interface of the tool attachment and is operable independently of the fastening interface to set a predefined angle position. The fastening interface may therefore be provided with or without an angle position setting unit.

The present invention therefore enables an angle adjustment of the attachment housing in relation to the handheld power tool, which is independent of an angle adjustment with the aid of the fastening interface. Therefore, the angle adjustment is independent of a flaw, damage, or soiling of the fastening interface. At the same time, comparatively low tolerance requirements result for the manufacture of the fastening interface and the angle adjustment may be carried out detached from the handheld power tool.

According to one specific embodiment, the fastening interface has a second angle position setting unit, which is designed to enable setting of the predefined angle position during the fastening of the fastening interface on the handheld power tool. The second angle position setting unit is formed in particular by securing elements for the anti-twist protection.

Due to the use of a first and a second angle position setting unit, the penetration of dirt particles into the fastening interface and the tool attachment is made more difficult overall.

The first angle position setting unit is preferably designed to enable a change of the predefined angle position, which is set using the second angle position setting unit during the fastening of the fastening interface on the handheld power tool, in the locked state of the locking unit.

The present invention therefore opens up a further possibility for the angle setting of the tool attachment for a user.

The second angle positioning unit preferably has an angle setting element associated with the fastening interface, which is rigidly connected to the attachment housing.

The second angle position setting unit preferably has an angle setting element associated with the fastening interface, which has an angle setting toothing.

A simple and stable angle position setting unit may thus be provided. The angle setting element, for example, a toothing, may be fixedly or rigidly connected to the angle position setting unit or may be an integral part of this angle position setting unit.

The angle setting element is preferably designed to be tubular at least sectionally and has an angle setting toothing.

The present invention therefore enables the provision of a tool attachment having a robust and cost-effective locking body.

The second angle position setting unit preferably has a centering aid for the axial centering of the fastening interface on the handheld power tool.

A largely automatic centering of the tool attachment in the course of a fastening operation on the handheld power tool is thus made possible.

The centering aid is preferably designed to be conical at least sectionally.

Effective, substantial centering of the tool attachment on the handheld power tool may therefore be achieved.

The first angle position setting unit preferably has a tubular centering sleeve, which is at least sectionally enclosed coaxially by an angle setting element associated with the fastening interface to provide a centering area, a force-loaded form fit being formed between the centering sleeve and the angle setting element in every settable angle position.

In this way, an angle adjustment which is independent of the second angle position setting unit and therefore of the fastening interface is provided.

According to one specific embodiment, the form fit may be formed by an engagement of a first angle setting toothing, which is associated with the centering sleeve, in a second angle setting toothing, which is associated with the angle setting element.

The present invention therefore enables the reliable anti-twist protection of the attachment housing when the user releases it after setting a desired angle position.

The second angle setting toothing is preferably formed on a circumferential shoulder of the angle setting element, which is oriented radially inward, and faces away from the fastening interface.

In this way, a particularly space-saving integration of the second angle position setting unit is implementable.

The angle setting element is preferably connected to the attachment housing with the aid of a sleeve-type connecting element.

In this way, a mechanically reliable connection is provided between the second angle position setting unit and the attachment housing.

According to one specific embodiment, a compression spring is situated between a flange, which is oriented radially inward, of the connecting element and a locking ring which is situated on the angle setting element.

In this way, the second angle position setting unit returns automatically into its formfitting and therefore anti-twist protected engaged position after a user releases the attachment housing. In addition, the manufacture of the tool attachment is made easier.

The first angle position setting unit includes in particular a first angle setting toothing and second angle setting toothing, a force-loaded form fit being implemented between the first angle setting toothing and the second angle setting toothing in every settable angle position. The first angle setting toothing is preferably implemented on a centering sleeve, which is associated with the drive unit of the tool attachment. The second angle setting toothing is preferably situated on a main body of the tool attachment. In a special specific embodiment, the angle setting toothing of the second angle position setting unit is situated on the main body. In an alternative specific embodiment, in which no second angle position setting unit is provided, the main body does not have an angle setting toothing.

The first angle position setting unit is preferably operable by a combined longitudinal and rotational movement of the attachment housing for changing the predefined angle position.

In this way, an angle adjustment functionality of the tool attachment which may be handled intuitively by the user is implemented.

According to one specific embodiment, the locking unit has a locking body, which is designed to be tubular at least sectionally, and an operating ring situated on the locking body, which is operable for locking the locking body on the handheld power tool.

The present invention therefore enables the provision of a tool attachment having a robust and cost-effective locking body, which may be designed as a cost-effective and robust component, like the operating ring.

The locking body preferably has at least two locking elements, which are designed in the manner of bayonets for forming a bayonet joint.

In this way, rapid, stable, and reliable locking of the tool attachment on an associated handheld power tool is possible.

The object mentioned at the outset is furthermore achieved by a tool system having a handheld power tool and a tool attachment according to the present invention.

DETAILED DESCRIPTION OF THE INVENTION

Figure 1:
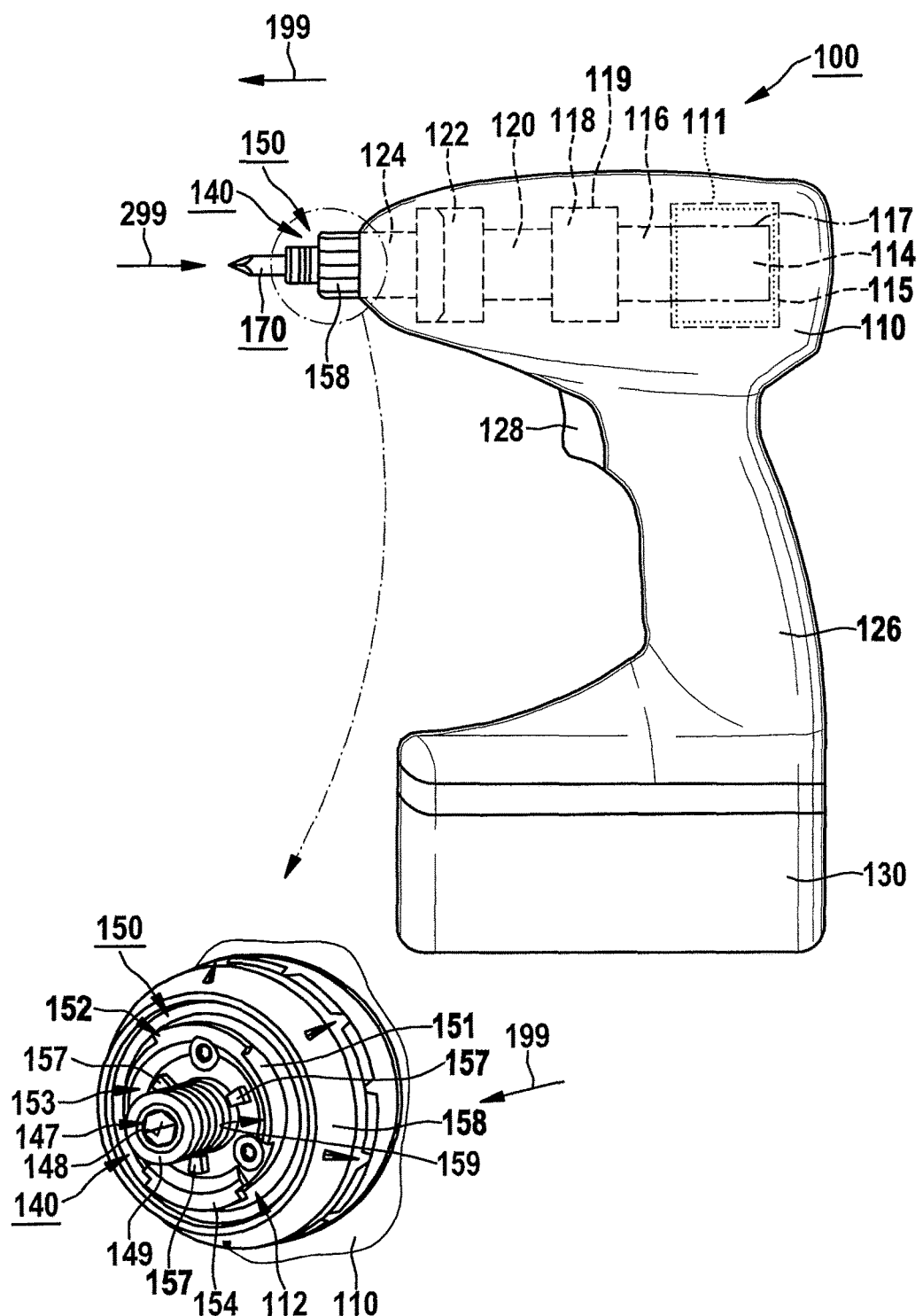
FIG. 1 shows a schematic view of a handheld power tool including a tool receptacle and a fastening interface according to one specific embodiment.

FIG. 1 shows a handheld power tool 100, which is provided with a tool receptacle 140 and a fastening interface 150, and which includes a housing 110 having a handle 126. According to one specific embodiment, handheld power tool 100 is mechanically and electrically connectable to a rechargeable battery pack 130 for the network-independent power supply. Handheld power tool 100 is designed here as a cordless screwdriver as an example. However, it is to be noted that the present invention is not restricted to cordless screwdrivers, but rather may be used in various handheld power tools, which have a fastening interface corresponding to fastening interface 150, regardless of whether the handheld power tool is operable electrically, i.e., network-independent using rechargeable battery pack 130, or network-dependent and/or non-electrically, for example, in the case of cordless impact drivers.

An electrical drive motor 114, which is supplied with power from rechargeable battery pack 130, a transmission 118, and an optional torque setting device 122 are situated in housing 110. Drive motor 114 is operable, i.e., it may be turned on and off, via a manual switch 128, for example, and preferably may be electronically controlled or regulated in such a way that both reverse operation and specifications with regard to a desired rotational speed are implementable.

According to one specific embodiment, drive motor 114 is an electronically commutated drive motor, preferably a DC motor, which illustratively has stator and rotor components 111 and 117. In this case, stator components 111 form an external stator, for example, and rotor components 117 form an internal rotor, for example. However, it is to be noted that the description of a drive motor designed like an electronically commutated drive motor having an external stator and an internal rotor only has exemplary character and is not to be understood as a restriction of the present invention, which may also be used with a drive motor including an internal stator and an external rotor or, for example, in a commutator motor with brushes.

Drive motor 114 is connected via an associated motor shaft 116 to transmission 118, which converts a rotation of motor shaft 116 into a rotation of a drive element 120, for example, a driveshaft, provided between transmission 118 and torque setting device 122. This conversion preferably takes place in such a way that drive element 120 rotates in relation to motor shaft 116 with increased torque, but reduced rotational speed. Drive motor 114 is illustratively situated in a motor housing 115 and transmission 118 is situated in a transmission housing 119, transmission housing 119 and motor housing 115 being situated in housing 110 as an example.

Tool receptacle 140 is preferably implemented on an output shaft 124 and, illustratively, has a receptacle body 147 including an internal polygon receptacle 148, which is provided for receiving insertion tools having external polygon couplings. A locking sleeve 149, which is spring-loaded by a spring element in an axial direction 199 facing away from handheld power tool 100, for locking suitable insertion tools in internal polygon receptacle 148, is situated on the external circumference of receptacle body 147, which is connected in a rotationally fixed way and/or in one piece to output shaft 124.

Tool receptacle 140 is designed, for example, like a bit holder, i.e., to receive an insertion tool 170 designed like a screwdriver bit, which is insertable in the direction of handheld power tool 100, as indicated by an arrow 299, into internal polygon receptacle 148. Such a screwdriver bit, which is, for example, of the so-called HEX type, is sufficiently known from the related art, so that an extensive description will be omitted here for the purpose of conciseness of the description. However, it is to be noted that the present invention is not restricted to a use of HEX screwdriver bits, but rather further insertion tools may also be used depending on a particular selected design of tool receptacle 140, for example, HEX drills or so-called SDS quick insertion tools. In addition, it is to be noted that the construction and the functionality of a suitable bit holder are also sufficiently known to those skilled in the art, so that an extensive description of bit holder 140 may be omitted here for the purpose of conciseness of the description.

According to one specific embodiment, fastening interface 150, which is illustratively fastened axially and radially immovable in the area of bit holder 140 on housing 110 and is referred to hereafter as "machine interface 150" for the purpose of clarity of the description, is associated with handheld power tool 100. Machine interface 150 is preferably fastened axially and radially immovable in the area of front-face 112 of housing 110 and/or on transmission housing 119. However, it is to be noted that machine interface 150 is designed as a separate component solely as an example and alternatively thereto may also be implemented in one piece with housing 110 and/or transmission housing 119.

Machine interface 150 is used for the anti-twist protected fastening, in particular a fastening aligned in a predefined angle position, of a preferably replaceable tool attachment (200 in FIG. 2) and has illustratively a fastening element 151 fastened in an anti-twist protected way on a front-face 112 of housing 110 and/or of transmission housing 119. This fastening element is designed, for example, to be at least sectionally sleeve-shaped or ring-shaped and is fastened in the area of a terminus sleeve or protective sleeve 158, which is situated in a ring shape on front-face 112 on housing 110, using suitable fastening elements, for example, screws or rivets, but may alternatively thereto also be designed in one piece with housing 110 and/or transmission housing 119. Fastening element 151 preferably encloses bit holder 140 at least sectionally with a predefined radial spacing, to enable an axial displacement of locking sleeve 149 of bit holder 140 in the interior of fastening element 151.

Fastening element 151 is preferably designed to enable an anti-twist protected axial centering of an associated tool attachment (200 in FIG. 2) on housing 110. Illustratively, fastening element 151 has at least two holding elements 152, 154 in the form of circular ring segments on its outer circumference, which are designed in the manner of bayonets to form a bayonet joint. However, it is to be noted that the description of such a bayonet joint only has an exemplary character and does not serve as a restriction of the present invention. Rather, alternative fastening options, for example, so-called wire bracket locking or ball locking, may also be used.

In addition, a centering aid 153, which is designed like a ring-shaped conical surface 159, is provided on the internal circumference of fastening element 151. Furthermore, fastening element 151 has at least one and, for example, three angle setting elements 157. However, it is to be noted that the described design of centering aid 153 and the specified number of angle setting elements 157 only has an exemplary character and does not represent a restriction of the present invention. Rather, other designs and numbers are possible, for example, centering aid 153 may have multiple conical arc sections instead of a ring-shaped conical surface 159 and six or more angle setting elements may be used instead of three angle setting elements 157, etc.

Figure 2:
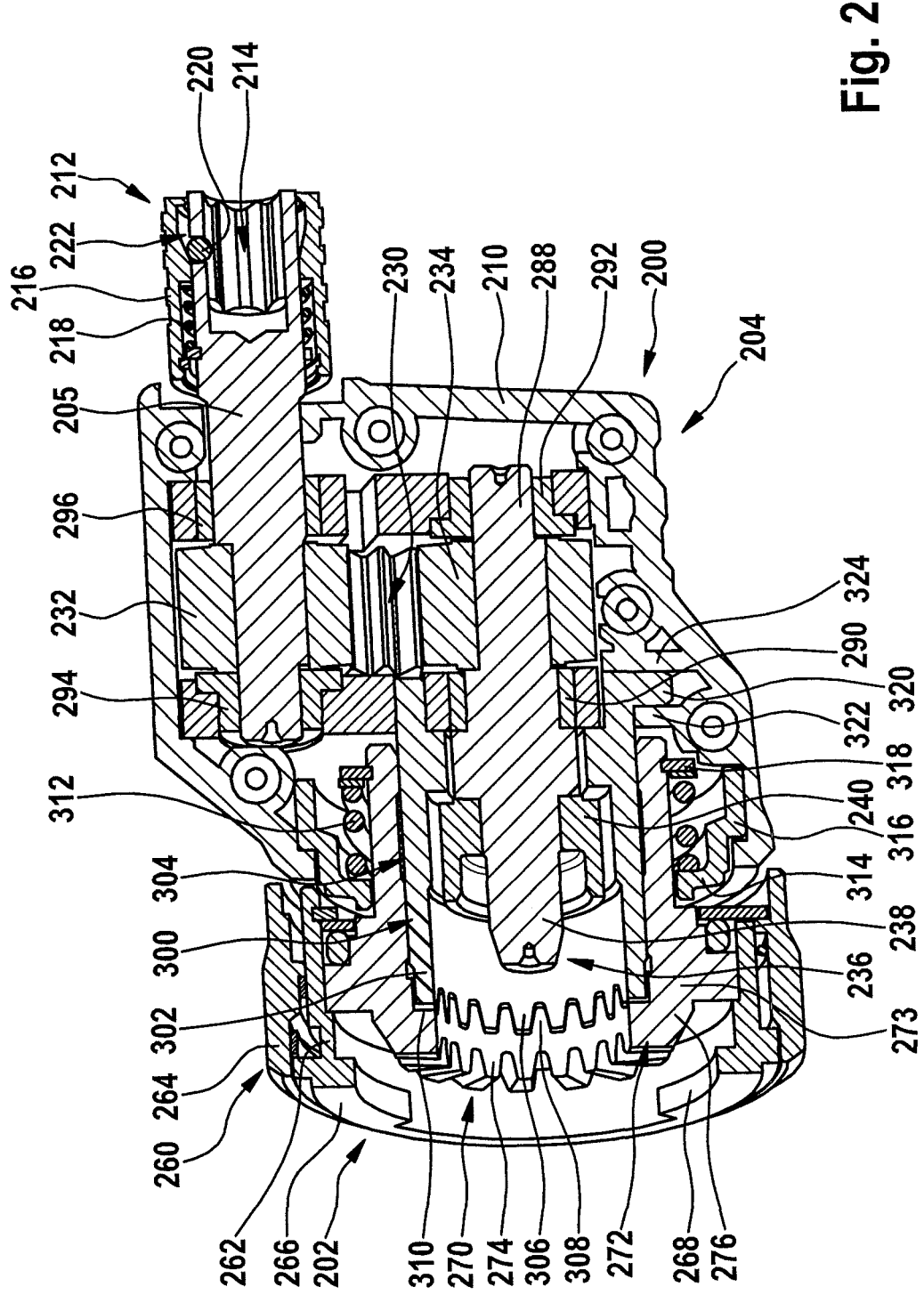
FIG. 2 shows a perspective sectional view through a first tool attachment including a first and a second angle position setting unit according to one specific embodiment, and including a fastening interface for fastening on the handheld power tool of FIG. 1.

FIG. 2 shows an exemplary tool attachment 200 for fastening on handheld power tool 100 from FIG. 1. In this case, tool attachment 200 is preferably detachably fastenable on machine interface 150 of handheld power tool 100 from FIG. 1 and is therefore replaceable with other tool attachments, for example, tool attachment 400 from FIG. 5.

According to one specific embodiment, replaceable tool attachment 200 is designed like an eccentric attachment and has, for example, a fastening interface 202, which is also referred to hereafter for the purpose of clarity of the description as an "attachment interface," and a drive unit 204, which is also referred to hereafter as an "eccentric drive section." However, it is to be noted that tool attachment 200 is only designed as an eccentric attachment as an example and not to restrict the present invention. Rather, replaceable tool attachment 200 may have an arbitrary design, for example, like an angled attachment, a drill attachment, as a flexible shaft, etc. Using such replaceable tool attachments, a complex tool system may be provided using only one handheld power tool. To simplify the description, replaceable tool attachment 200 is also referred to hereafter as an "eccentric attachment 200."

Eccentric drive section 204 has, for example, an attachment housing 210, in which a rotationally drivable driveshaft 288 is mounted rotationally movable in two bearing elements 290, 292. Driveshaft 288 is used to drive an output shaft 205, which is situated offset in parallel thereto, and which is also mounted rotationally movable in attachment housing 210—for example, in two bearing elements 294, 296—and which may be designed, for example, for the latching accommodation of insertion tool 170, which is designed as a screwdriver bit, for example, from FIG. 1. A polygonal receptacle 214 is implemented on an axial end 212 of output shaft 205 facing away from attachment interface 202. Furthermore, a locking sleeve 216 is situated on output shaft 205, which is spring-loaded with the aid of a compression spring 218 in the direction of free axial end 212 of output shaft 205. By axially displacing locking sleeve 216 against the force action of compression spring 218, a locking ball 220 is released, so that it may move outward in the radial direction and an insertion tool may be inserted into polygonal receptacle 214. By releasing locking sleeve 216, locking ball 220 is guided inward in the radial direction by a suitable control curve 222 until it, for example, at least sectionally engages in a correspondingly designed recess on the shaft of the insertion tool and in this way causes an axial position locking thereof or the falling out thereof from polygonal receptacle 214.

Driveshaft 288 drives output shaft 205, for example, via a suitable converter 230, which is implemented here as an example having a gear transmission including two spur gearwheels 232, 234. However, it is to be noted that a suitable implementation of eccentric drive section 204 is sufficiently known from the related art, so that an extensive description of eccentric drive section 204 may be omitted here for the purpose of conciseness of the description. A polygonal entrainment contour 238, which is at least sectionally coaxially enclosed by an actuating element 240, is implemented on a free axial end 236 of driveshaft 288.

During the installation of eccentric attachment 200 on machine interface 150 of handheld power tool 100 from FIG. 1, eccentric attachment 200 is guided thereto in the direction of arrow 299 from FIG. 1. In this case, actuating element 240 displaces locking sleeve 149 of handheld power tool 100 and free end 236 of driveshaft 288 engages in internal polygon receptacle 148 thereof.

According to one specific embodiment, attachment interface 202 has a locking unit 260. Locking unit 260 has a locking body 262, which is designed to be tubular at least sectionally, including at least two locking elements 266, 268, which are designed in the manner of bayonets, to provide a bayonet joint to the two holding elements 152, 154 of machine interface 150 from FIG. 1 in a locked state of eccentric attachment 200. Bayonet-type locking elements 266, 268 are designed to lock eccentric attachment 200 axially on handheld power tool 100. To change between this locked state—in which eccentric attachment 200 is fixedly connected to handheld power tool 100 from FIG. 1—and an unlocked state of eccentric attachment 200—in which it may be removed from handheld power tool 100—and vice versa, an actuating ring 264, which is also approximately tubular, is provided, which is twistable for operation.

Attachment interface 202 preferably has an angle position setting unit 270, which, by formfitting interaction with front-side angle setting element 157 on machine interface 150 from FIG. 1, enables setting of an arbitrarily predefinable angle position during the fastening of eccentric attachment 200 on handheld power tool 100 from FIG. 1, i.e., during the transition from the unlocked state into the locked state. For this purpose, angle position setting unit 270, which is preferably at least sectionally tubular, has an angle setting element 272, which is implemented here as an example with the aid of a front-side angle setting toothing 274, which thus faces away from eccentric drive section 204, and which is rigidly connected to attachment housing 210 or alternatively may be implemented integrally thereto. At least sectionally tubular angle position setting unit 270 includes a main body 273, on which angle setting element 272 is situated. Angle setting element 272 including angle setting toothing 274 is designed to fasten eccentric attachment 200 in an anti-twist protected way on handheld power tool 100.

An at least sectional form fit exists in the locked state in the particular selected angle position between angle setting toothing 274 and angle setting element 157 of machine interface 150 from FIG. 1. To make it even easier to fasten eccentric attachment 200 on machine interface 150 and in particular to change from the unlocked state into the locked state or to replace various tool attachments, angle position setting unit 270 has a front-side centering aid 276, which is designed to be at least sectionally conical here solely as an example. An at least sectional form fit exists in the locked state between this conical centering aid 276 and, correspondingly thereto, centering aid 153 which is also conical, of machine interface 150. Geometries deviating from the cone shape, for example, wedge-shaped or spherical contours, are also possible.

According to one specific embodiment, eccentric attachment 200 has a further angle position setting unit 300, which, even in the locked state and therefore completely independently of angle position setting unit 270, allows a change at any time of the angle position initially fixed using it during the fastening of eccentric attachment 200 on handheld power tool 100 from FIG. 1. Angle position setting unit 300 is preferably constructed having an essentially tubular centering sleeve 302, which is at least sectionally coaxially enclosed by angle setting element 272 while providing a centering area 304. Centering sleeve 302 has a first angle setting toothing 306 on its front-side axial end, i.e., facing away from eccentric drive section 204, which preferably has a force-loaded form fit with second angle setting toothing 308 in every settable angle position. This second angle setting toothing 308 is implemented on main body 273. Second angle setting toothing 308 is illustratively implemented on a circumferential shoulder 310, which faces radially inward, of main body 273, of angle setting element 272 here, second angle setting toothing 308 facing toward eccentric drive section 204, to enable the interlocking with first angle setting toothing 306. The tooth pitch of angle setting toothing 306, 308 is selected in such a way that the angle position may be set in sufficiently fine steps of, for example, 20°. The force application or the axial mechanical pre-tension of centering sleeve 302 takes place by a compression spring 312, one end of which is supported on a flange 314 of a connecting element 316, which is also at least sectionally hollow cylindrical, and the other end of which is supported on a locking ring 318 introduced into an external circumference of angle setting element 272. Centering sleeve 302 has, on its end facing away from first angle setting toothing 306, a sectionally circumferential flange 320, which is oriented radially outward, and which is clamped or fastened between two sectionally circumferential projections 322, 324, which are oriented radially inward, of attachment housing 210.

Figure 3:
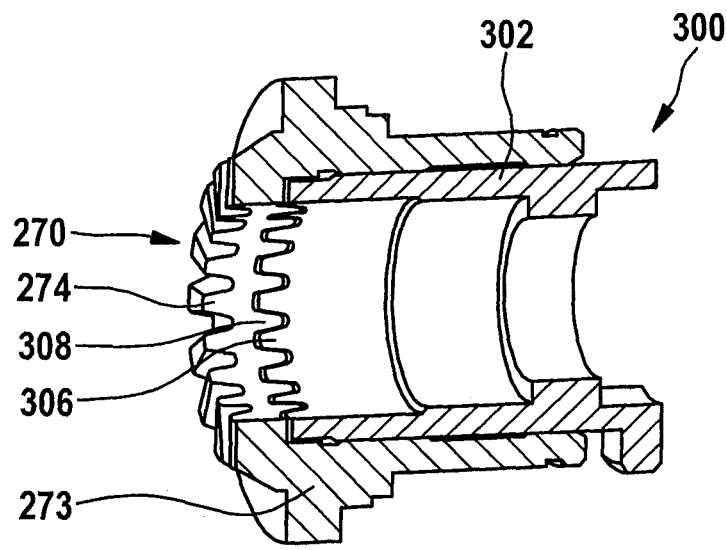
FIG. 3 shows a perspective view of the second angle position setting unit, which is in a formfitting engagement with the first angle position setting unit, from FIG. 2.
Figure 4:
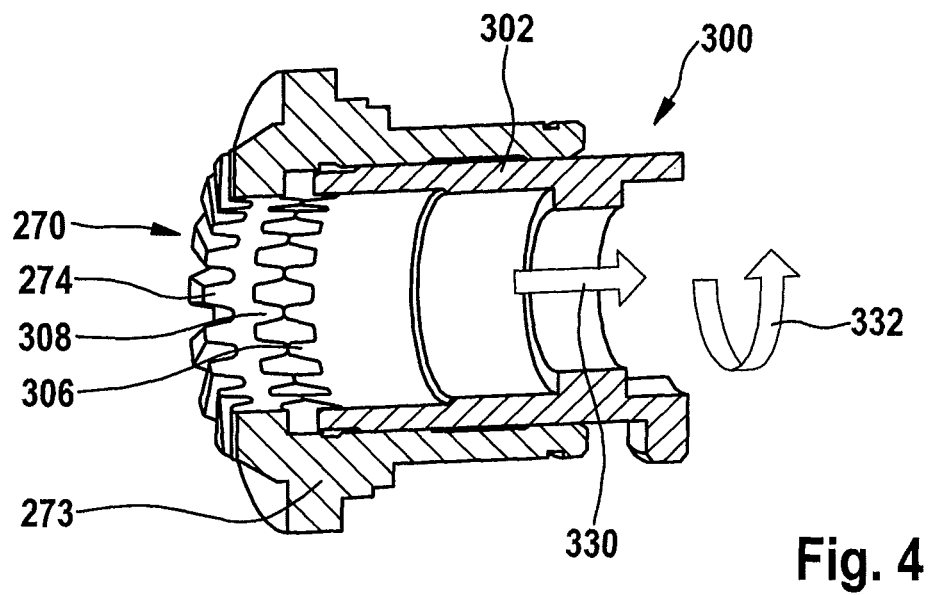
FIG. 4 shows a perspective view of the second angle position setting unit, which is disengaged, from FIG. 2.

FIGS. 3 and 4—to which reference is also made hereafter—show angle position setting units 270, 300 from FIG. 2 during operation of replaceable eccentric attachment 200 from FIG. 2. In this case, a force-loaded form fit initially exists between rear angle setting toothing 308 of angle position setting unit 270 and centering sleeve 302 of angle position setting unit 300. According to the present invention, proceeding from the position shown in FIG. 3—and regardless of the state of fastening interfaces 150, 202 of handheld power tool 100 and eccentric attachment 200—an arbitrary angle position of eccentric attachment 200 from FIG. 2 may be set in relation to handheld power tool 100 from FIG. 1, in that attachment housing 210 and, with it, centering sleeve 302 may be moved in the axial direction in the direction of an arrow 330—against the force action of compression spring 312 from FIG. 2—and therefore angle setting toothing 306, 308 is disengaged.

In the position of centering sleeve 302 shown in FIG. 4, it may be pivoted or repositioned, for example, in the direction of a circular arrow 332 in relation to angle position setting unit 270, until an angle position which is changed as required is reached. By releasing centering sleeve 302, which is force-loaded with the aid of the compression spring, angle setting toothings 306, 308 are then again automatically engaged with one another in the angle position set by the user and the repositioning operation is ended.

Therefore, the user may change the angle position between eccentric attachment and handheld power tool—independently of the possibility of initially fixing it during the fastening of the eccentric attachment—at any time by an intuitive, combined longitudinal and rotational movement, as indicated by arrows 330, 332, for example, to adapt easily and rapidly to a possibly changed working situation. This takes place by a combined longitudinal and rotational movement of attachment housing 210 or drive unit 204, which is associated with attachment housing 210, in relation to fastening interface 202.

Figure 5:
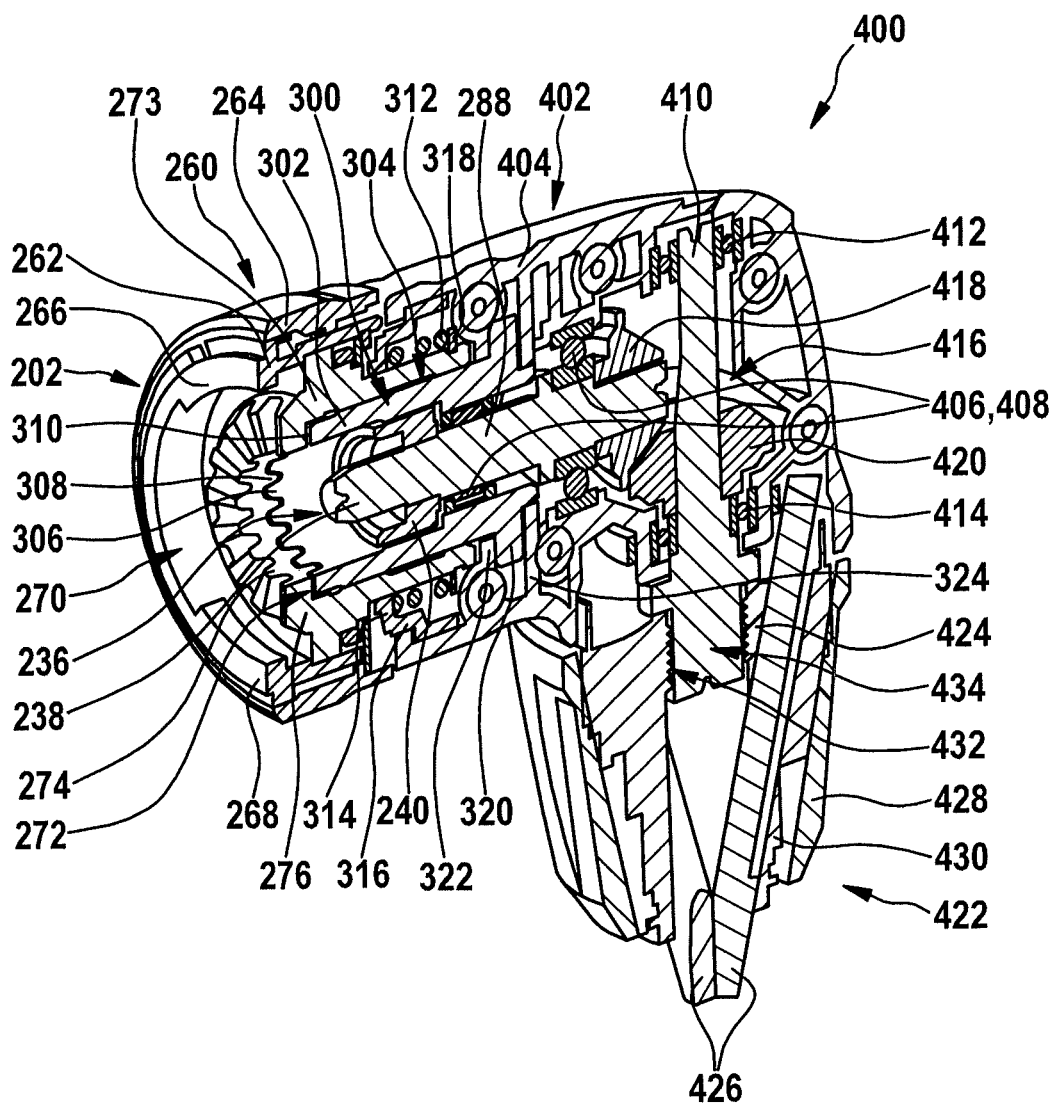
FIG. 5 shows a perspective sectional view of a second tool attachment for fastening on the handheld power tool from FIG. 1.

FIG. 5 shows an alternative tool attachment 400, which is replaceable, for example, with eccentric attachment 200 from FIG. 2 and is also fastenable on handheld power tool 100 from FIG. 1. Tool attachment 400, which is designed here solely as an example as a replaceable angled drill chuck attachment, has, for example, attachment interface 202 from FIG. 2, and a drive unit 402, which is also referred to hereafter as a "angled drive section."

Angled drive section 402 has, for example, an attachment housing 404, in which a rotationally drivable driveshaft 288 from FIG. 2 is mounted rotationally movable in two bearing elements 406, 408. Driveshaft 288 is used for driving an output shaft 410, which is situated perpendicularly or orthogonally thereto, and which is also mounted rotationally movable in attachment housing 404—for example, in two bearing elements 412, 414. Driveshaft 288 drives output shaft 410 via an (angled) converter 416, which is implemented here as an example having a gear transmission including two bevel gears 418, 420. However, it is to be noted that a suitable implementation of angled drive section 402 is sufficiently known from the related art, so that an extensive description may be omitted here.

Angled drive section 402 preferably has a chuck unit 422. This has a support body 424, on which a plurality of clamping jaws 426 is mounted, which are operable via a clamping body 430, which is provided with a clamping sleeve 428, for the radial chucking of an insertion tool, for example, a round drill, of a correspondingly designed screwdriver bit or the like.

Support body 424 is fastened in an anti-twist protected way, for example, via a screw connection 432 on an axial end area 434 of output shaft 410, so that support body 432 rotates together with output shaft 410 during a rotational movement thereof.

Figure 6:
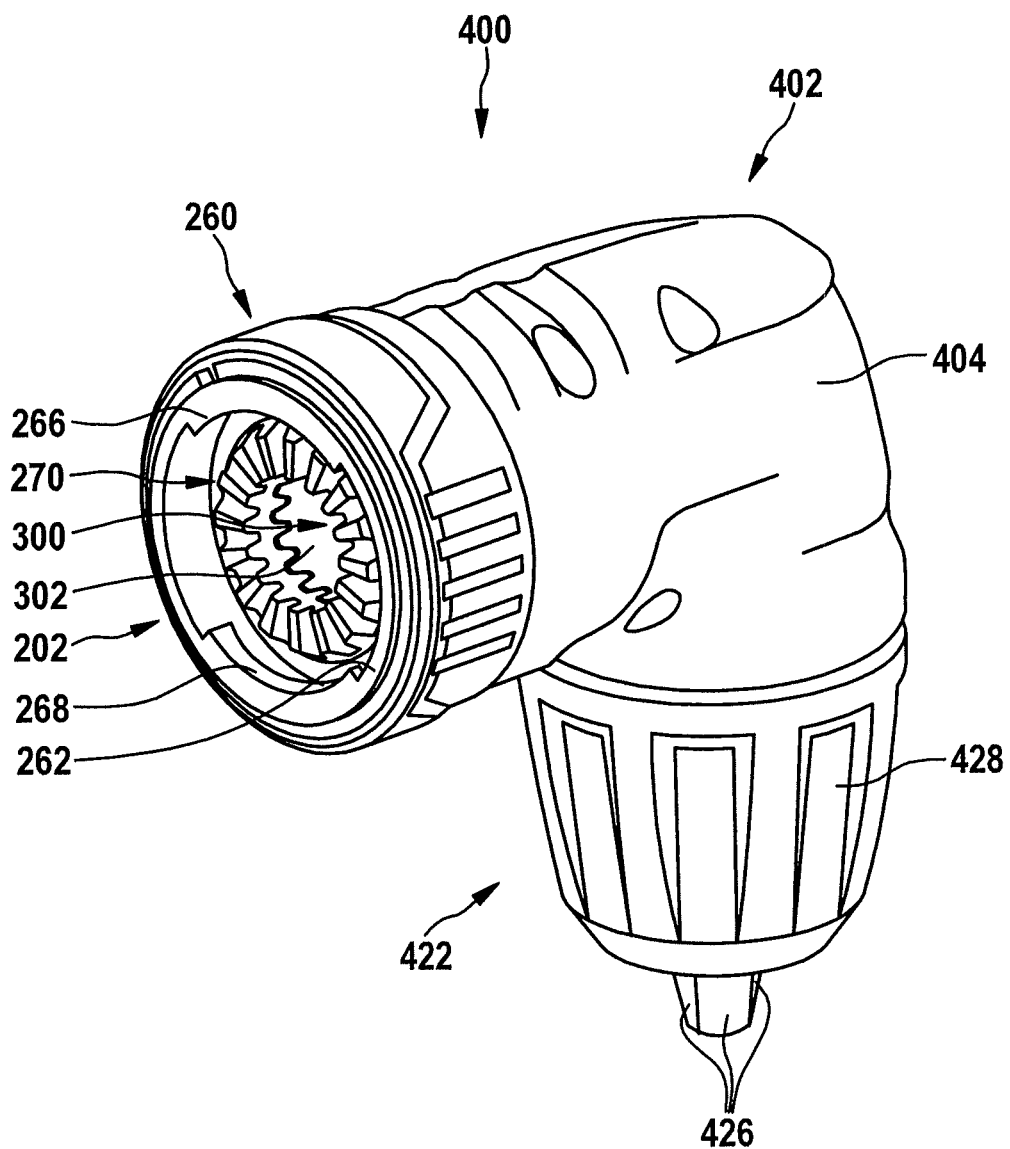
FIG. 6 shows a perspective view of the tool attachment from FIG. 5.

FIG. 6 shows angled chuck attachment 400 including attachment interface 202 from FIG. 2 and angled drive section 402 from FIG. 4, with chuck unit 422 adjoining at the end thereon. Attachment interface 202 includes, as described in FIG. 2, locking unit 260, which includes ring-shaped locking body 262 including locking elements 266, 268, which are designed like bayonets and are situated diametrically opposite to one another, and angle position setting units 300, 270 including tubular centering sleeve 302.

First angle position setting unit 300 is described in the present case in combination with fastening interface 202 of tool attachments 200, 400. Fastening interface 150 of handheld power tool 100 and fastening interface 202 of tool attachments 200, 400 are designed to bring about axial securing and an anti-twist protection of tool attachments 200, 400 on a stationary housing component, in particular housing 110 and/or transmission housing 119, of handheld power tool 100. Holding elements 152, 154, which are in the form of circular ring segments, and which are designed in the manner of bayonets, and locking elements 266, 268, which are designed in the manner of bayonets, form axial securing elements, which correspond to one another, for the axial securing of tool attachments 200, 400 on handheld power tool 100. Angle setting elements 157 and angle setting toothing 274 form anti-twist protection elements, which correspond to one another, for the anti-twist protection of tool attachments 200, 400 on handheld power tool 100. The function of first angle position setting unit 300 is not restricted, however, to a specific fastening interface on the tool attachment and the handheld power tool. The advantage of first angle position setting unit 300 is in particular that it is designed separately from the fastening interface and is therefore designed independently of a specifically formed fastening interface.

Alternative specific embodiments of the fastening interface and the securing elements for the axial securing and securing elements for the anti-twist protection are possible. An alternative fastening interface including the corresponding securing elements is described, for example, in DE 10 2011 084 495 A1, the content of the disclosure of which is explicitly incorporated in the present description, so that an extensive description thereof may be omitted here for the purpose of conciseness of the description. A further alternative fastening interface including the corresponding securing elements is described, for example, in DE 10 2011 084 499 A1, the content of the disclosure of which is explicitly incorporated in the present description, so that an extensive description thereof may be omitted here for the purpose of conciseness of the description.

Further alternative securing elements are also possible. Thus, for example, a clamping element, for example, a clamping lever on the tool attachment, may also be used as an axial securing element, which interacts with a circumferential groove on the housing of the handheld power tool.

Figure 7:
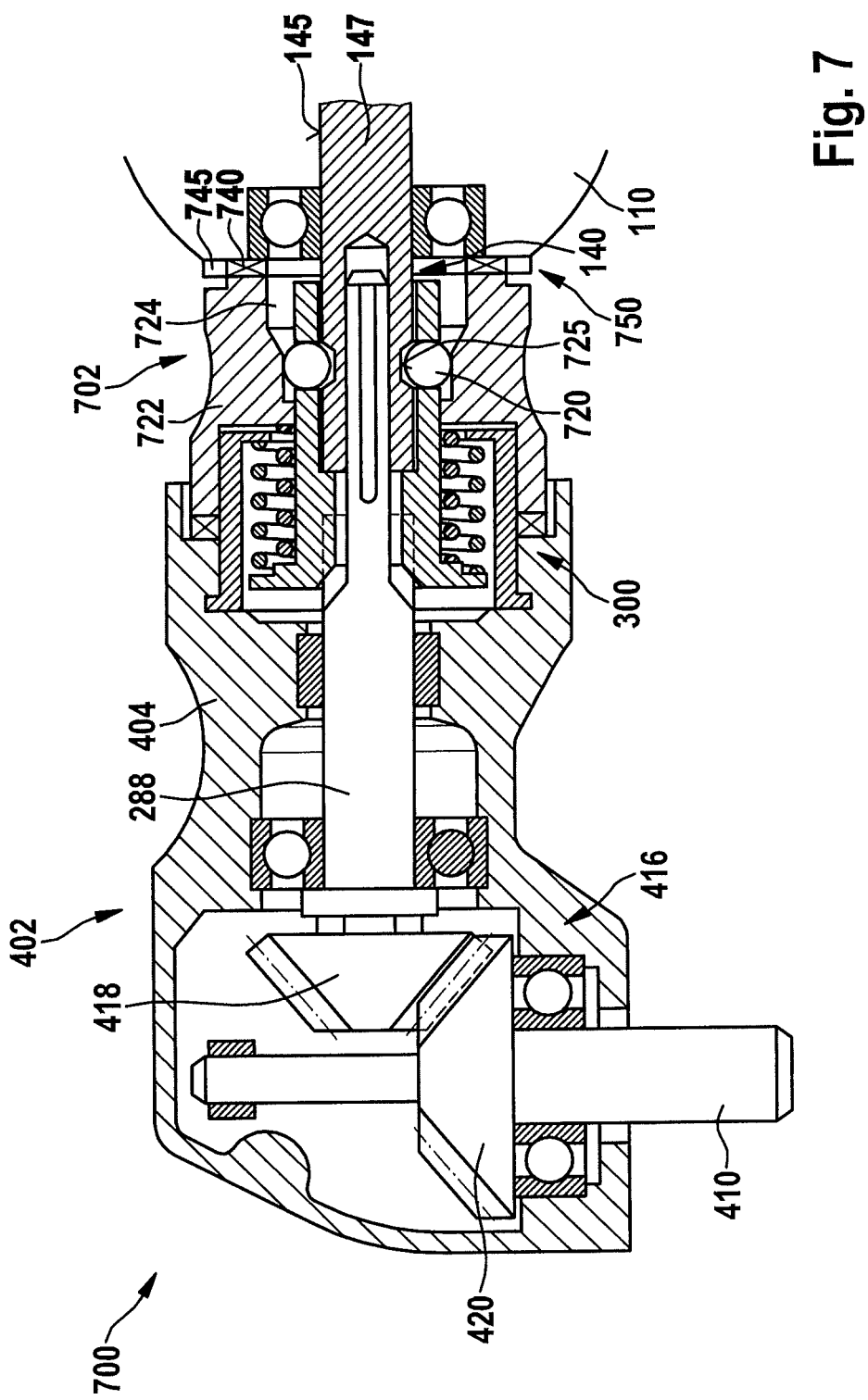
FIG. 7 shows a schematic sectional view of an alternative tool attachment.

In another alternative specific embodiment of a lock of a tool attachment on a handheld power tool, securing elements are implemented for the anti-twist protection on a stationary housing component such as the housing and/or the transmission housing. The anti-twist protection elements may be locking projections, for example, for which corresponding locking openings are provided on the tool attachment. In contrast, securing elements for the axial securing are provided on the output spindle or the bit holder of the handheld power tool. A circumferential groove on the circumferential surface of the bit holder may be provided as the axial securing element. Correspondingly, at least one locking body which interacts with the grooves, for example, a locking ball, is situated on the tool attachment. For the purpose of locking, the locking body engages in the groove on the bit holder. Such an alternative tool attachment 700 is schematically shown in FIG. 7 in a sectional view. Tool attachment 700 is designed as an example as a replaceable angled chuck attachment. It has angle position setting unit 300 in combination with a fastening interface 702 alternative to fastening interface 202 for the replaceable fastening of tool attachment 700 on a corresponding alternative fastening interface 750 of the handheld power tool. Furthermore, it has a drive unit 402 according to FIG. 5, which is also referred to hereafter as the "angled drive section." Angled drive section 402 has, for example, an attachment housing 404, in which rotationally drivable driveshaft 288 is mounted rotationally movable. Driveshaft 288 is used to drive an output shaft 410, which is situated perpendicularly or orthogonally thereto, and which is also mounted rotationally movable in attachment housing 404. Driveshaft 288 drives output shaft 410 via an (angled) converter 416, which is implemented here as an example with a gear transmission including two bevel gears 418, 420. Angled drive section 402 preferably has a chuck unit (not shown). Angle position setting unit 300 is designed as described in conjunction with FIGS. 2 through 6.

Fastening interface 702 has locking bodies 720 in the form of locking balls as the axial securing elements. Locking bodies 720 engage in a corresponding securing element implemented on fastening interface 750 in the form of a locking recess 725. Locking recess 725 according to FIG. 7 is designed as a circumferential locking groove. Instead of a circumferential locking groove, multiple individual locking recesses may also be provided, which each accommodate one locking body 720. Locking recess 725 is implemented on tool receptacle 140. For this purpose, an external surface 145 of receptacle body 147 has locking recess 725. For the replaceable fastening of tool attachment 700, a force acting radially inwardly is applied to locking bodies 720 in such a way that they are held in locking recess 725. The force application takes place by a spring-loaded locking ring 722, which is mounted longitudinally displaceable on attachment housing 404, and which is designed as an operating element. To remove tool attachment 700, locking ring 722 is moved away in the axial direction from housing 110 of the handheld power tool, whereby locking bodies 720 yield radially outwardly into receptacles 724 in locking ring 722.

Furthermore, fastening interface 702 has securing elements for the anti-twist protection of tool attachment 700 on fastening interface 750 of the handheld power tool. Locking projections 740, which engage in corresponding locking openings 745 on housing 110 of the handheld power tool, are provided as the anti-twist protection elements. For this purpose, locking projections 740 and locking openings 745 are each implemented in the form of a gear ring having regularly or irregularly situated locking toothing.

The function of first angle position setting unit 300 is furthermore not restricted to the combination with second angle position setting unit 270. The advantage of first angle position setting unit 300 is in particular that it is implemented separately from the fastening interface, so that an angle position setting unit on the fastening interface may be omitted.

What is claimed is:

1. A tool attachment, comprising:
   an attachment housing;
   a fastening interface situated on the attachment housing for detachable fastening on a handheld power tool, the fastening interface having a locking unit which, (i) in a locked state, locks the tool attachment for operation on the handheld power tool, and (ii) in an unlocked state, enables a removal of the tool attachment from the handheld power tool; and
   a first angle position setting unit for setting a predefined angle position of the tool attachment on the handheld power tool, wherein the first angle position setting unit is configured to be operable in the locked state and in the unlocked state of the locking unit to enable a change of the predefined angle position,
   wherein the first angle position setting unit is operated by a combined and simultaneous longitudinal and rotational movement of the attachment housing in relation to the fastening interface to change the predefined angle position.

2. The tool attachment as recited in claim 1, wherein the first angle position setting unit is configured to enable a setting of the predefined angle position with the fastening interface fastened on the handheld power tool.

3. The tool attachment as recited in claim 1, wherein the fastening interface has a second angle position setting unit configured to enable a setting of the predefined angle position during the fastening of the fastening interface on the handheld power tool.

4. The tool attachment as recited in claim 3, wherein the first angle position setting unit is configured to enable a change of the predefined angle position, which is set using the second angle position setting unit during the fastening of the fastening interface on the handheld power tool, in the locked state of the locking unit.

5. The tool attachment as recited in claim 3, wherein the second angle position setting unit has an angle setting unit, which is associated with the fastening interface and is rigidly connected to the attachment housing.

6. The tool attachment as recited in claim 3, wherein the second angle position setting unit has an angle setting element, which is associated with the fastening interface and has an angle setting toothing.

7. The tool attachment as recited in claim 3, wherein the second angle position setting unit has a centering aid for the axial centering of the fastening interface on the handheld power tool.

8. The tool attachment as recited in claim 7, wherein the centering aid is conical in at least in one section.

9. The tool attachment as recited in claim 1, wherein the first angle position setting unit has a tubular centering sleeve, which is at least sectionally coaxially enclosed by an angle setting element associated with the fastening interface to provide a centering area, a force-loaded form fit being implemented between the centering sleeve and the angle setting element in every settable angle position.

10. The tool attachment as recited in claim 9, wherein the form fit is implemented by an engagement of a first angle setting toothing which is associated with the centering sleeve, with a second angle setting toothing which is associated with the angle setting element.

11. The tool attachment as recited in claim 10, wherein the second angle setting toothing is implemented on a circumferential shoulder, which is oriented radially inward, of the angle setting element and faces away from the fastening interface.

12. The tool attachment as recited in claim 9, wherein the angle setting element is connected with the aid of a sleeve-type connecting element to the attachment housing.

13. The tool attachment as recited in claim 12, wherein a compression spring is situated between a flange, which is oriented radially inward, of the connecting element and a locking ring situated on the angle setting element.

14. The tool attachment as recited in claim 1, wherein the first angle position setting unit includes a first angle setting toothing and a second angle setting toothing, a force-loaded form fit being implemented between the first angle setting toothing and the second angle setting toothing in every settable angle position.

15. The tool attachment as recited in claim 14, wherein the first angle setting toothing is implemented on a centering sleeve associated with the drive unit.

16. The tool attachment as recited in claim 15, wherein the second angle setting toothing is situated on a main body of the tool attachment.

17. The tool attachment as recited in claim 16, wherein the angle setting toothing of the second angle position setting unit is situated on the main body.

18. The tool attachment as recited in claim 1, wherein the locking unit has an at least sectionally tubular locking body and an actuating ring situated on the locking body, and wherein the actuating ring is operable to lock the locking body on the handheld power tool.

19. The tool attachment as recited in claim 18, wherein the locking body has at least two locking elements which are implemented in the manner of bayonets to form a bayonet joint.

20. The tool attachment as recited in claim 1, wherein the first angle position setting unit includes a first angle setting element and a second angle setting element, a force-loaded form fit being implemented between the first angle setting element and the second angle setting element in every settable angle position.

21. A tool attachment, comprising:
an attachment housing;
a fastening interface situated on the attachment housing for detachable fastening on a handheld power tool, the fastening interface having a locking unit which, (i) in a locked state, locks the tool attachment for operation on the handheld power tool, and (ii) in an unlocked state, enables a removal of the tool attachment from the handheld power tool;
a drive unit situated in the attachment housing for driving a tool receptacle of the tool attachment; and
a first angle position setting unit for setting a predefined angle position of the tool attachment on the handheld power tool, wherein the first angle position setting unit is configured to be operable to enable a change of the predefined angle position of the drive unit in relation to the fastening interface,
wherein the first angle position setting unit is operated by a combined and simultaneous longitudinal and rotational movement of the attachment housing in relation to the fastening interface to change the predefined angle position.

22. A tool system, comprising:
a handheld power tool; and
a tool attachment including:
an attachment housing;
a fastening interface situated on the attachment housing for detachable fastening on a handheld power tool, the fastening interface having a locking unit which, (i) in a locked state, locks the tool attachment for operation on the handheld power tool, and (ii) in an unlocked state, enables a removal of the tool attachment from the handheld power tool; and
a first angle position setting unit for setting a predefined angle position of the tool attachment on the handheld power tool, wherein the first angle position setting unit is configured to be operable in the locked state and in the unlocked state of the locking unit to enable a change of the predefined angle position,
wherein the first angle position setting unit is operated by a combined and simultaneous longitudinal and rotational movement of the attachment housing in relation to the fastening interface to change the predefined angle position.

23. A tool attachment, comprising:
an attachment housing;
a fastening interface situated on the attachment housing for detachable fastening on a handheld power tool, the fastening interface having a locking unit which, (i) in a locked state, locks the tool attachment for operation on the handheld power tool, and (ii) in an unlocked state, enables a removal of the tool attachment from the handheld power tool; and
a first angle position setting unit for setting a predefined angle position of the tool attachment on the handheld power tool, wherein the first angle position setting unit is configured to be operable in the locked state and in the unlocked state of the locking unit to enable a change of the predefined angle position,
wherein the fastening interface has a second angle position setting unit configured to enable a setting of the predefined angle position during the fastening of the fastening interface on the handheld power tool.

* * * * *